April 7, 1931.    C. F. MOORE    1,799,385
TUBE COATING BRUSH
Filed Feb. 28, 1927    2 Sheets-Sheet 1

Inventor
Charles F. Moore
By Brown, Boettcher Dienner
Attys

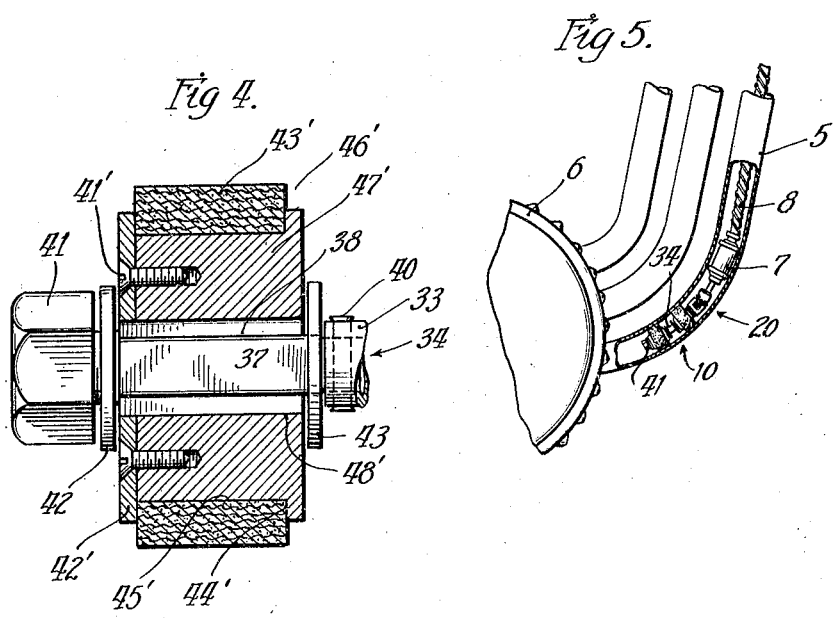

Patented Apr. 7, 1931

1,799,385

UNITED STATES PATENT OFFICE

CHARLES F. MOORE, OF BOSTON, MASSACHUSETTS, ASSIGNOR TO DAMPNEY COMPANY OF AMERICA, OF BOSTON, MASSACHUSETTS, A CORPORATION OF MASSACHUSETTS

TUBE-COATING BRUSH

Application filed February 28, 1927. Serial No. 171,449.

My present invention relates to tube coating apparatus and more particularly to tube coating brushes.

In the accompanying drawings:

Fig. 4 is a view of an oscillatory unit adapted for use in the brush shown in Fig. 1;

Fig. 5 is a diagrammatical view illustrating an application of the brush shown in Fig. 1.

Figure 1:
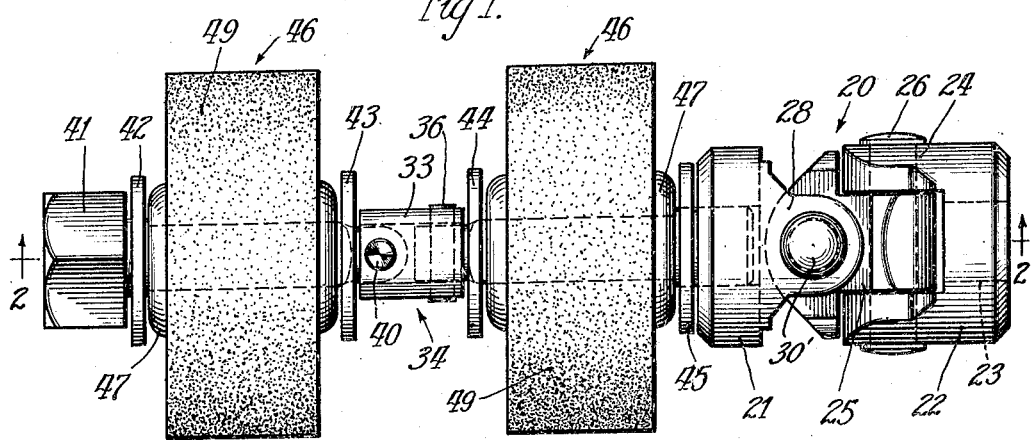
Figure 1 is an elevation of one form of my brush.

Referring now to the drawings in detail in which like reference numerals designate similar parts throughout the several views 20 denotes generally a universal joint including a pair of members 21 and 22. The member 22 may be driven by any suitable source of power as, for example, a turbine or air motor (not shown). The member 22 has a threaded opening 23 into which an end of a shaft may be threaded. Formed integral with the member 22 are a pair of spaced ears 24 which straddle the sides of an intermediate coupling or joint member 25. The ears 24 are pivotally attached to the member 25 by means of a pivot pin 26. This pin 26 extends through the portion 27 of the member 25. Member 21 has a pair of spaced ears or legs 28 which straddle the portion 29 of the intermediate coupling member 25. The ears 28 are connected to this portion 29 by means of a pivot pin 30' which pin is disposed at right angles to the pin 26.

The member 21 has threaded therein one end of a shaft section 30 which includes a squared or polygonal portion 31. The other end of the shaft section 30 telescopes into a sleeve 33 of a coupling or universal joint 34. This latter end of the shaft section is provided with an opening 35 through which extends a pivot pin 36 suitably anchored to the sleeve 33.

Disposed in axial alignment with the shaft section 30 is a second shaft section 37 provided with a squared or polygonal portion 38. One end of this section 37 is provided with an opening 39 through which extends a pivot pin 40. This end of the section 37 telescopes into the sleeve 33 and the pin 40 is anchored or riveted to the sleeve 33 thus establishing a pivotal connection between the sleeve and the shaft section 37. The other end of section 37 has threaded thereon a hexagonal nut 41. Positioned on the shaft section 37 are a pair of spaced washers 42 and 43 and positioned on the shaft section 30 are a pair of spaced washers 44 and 45. Associated with each of the shaft sections is a brush unit 46 which I shall now proceed to describe in detail.

Since the two brush units 46 are identical in construction it is believed that the description of one will suffice for both. Each unit includes an annular tubular member 47 preferably made of wood. The opening in this member is designated by the reference character 48 and is substantially rectangular in shape. Imbedded in the member 47 are a plurality of bristles 49 formed into an annular shape. That is to say, each of the units 46 includes an annular brush. The opening 48 is primarily so shaped that the member 47 may be slipped over the end of the shaft section, in assembling, but keys 49' are inserted and held on opposite sides of the squared portion of the shaft section, thus defining the ultimate rectangular shape of the opening 48 and preventing relative rotation between the shaft section and the brush units. Furthermore, it will be observed that the brush unit 46 is positioned between the pair of washers associated with the shaft section, which washers function to restrain the endwise movement of the brush unit 46.

Figure 3:
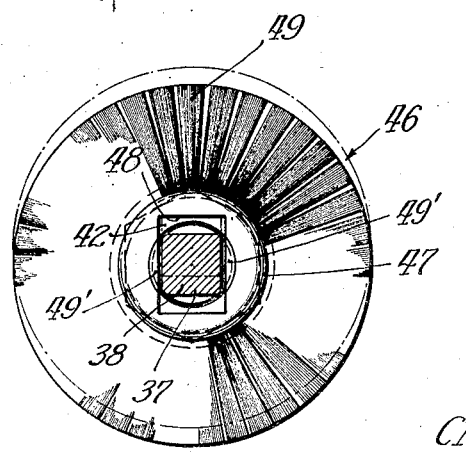
Fig. 3 is a vertical sectional view taken on the line 3—3 of Fig. 2 looking to the left.

Since the keys are only located on two sides of the associated squared portion of the shaft section the brush unit 46 is free to move laterally a limited amount on each of the other two sides. In Fig. 3 I have illustrated by dotted lines one of the positions to which the brush may be forced by centrifugal force when the brush construction is rotating.

The sidewise movement of each brush is limited by the wall of its member 47 contacting the associated side of the square shaft portion. In other words, the brush member 47 has an elongated opening of a larger dimension than the squared shaft portion upon which it is mounted which opening determines the lateral movement of the brush with respect to its shaft section.

In Fig. 5 I have illustrated the manner in which my novel brush construction may be used. In this application of the invention the brush is used to apply a coating to the inner wall of a curved boiler tube 5 connected to a boiler 6. The brush is designated generally by the reference character 10 and is connected by the coupling or universal joint 20 to the shaft of a turbine or air motor 7 which is in turn connected to a flexible air line 8. It will be evident from the illustration in Fig. 5 that the coupling or joint 34 functions to enable the brush units to move relative to each other and also to enable the brush to accommodate itself to the curvature of the tube 5. The coupling 20 enables the brush to flex sidewise without interfering with the motor drive shaft. Also, the joint or coupling 34 in permitting the first brush unit to move relative to its normal axis prevents end nut 41 from at any time contacting with the inner surface of the tube.

From the foregoing it will be apparent that the two brush units are adapted to be moved relative to each other as well as relative to the drive shaft of the motor. This enables the surface being covered or coated to be more uniformly coated than is possible with the usual type of coating apparatus. Then, too, these brushes will function to rub the coating into all parts of the inner wall of the tube irrespective of any irregularities or small pits therein.

Although in use of the apparatus the axis of rotation is maintained more or less co-incident with the center of the tube, and the tubes are of greater diameter than the brushes, the brushes are permitted to move outwardly and are thrown outwardly by centrifugal force, thus insuring their appropriate wiping of the tube's inner surface at all times and with sufficient pressure to follow pits and irregularities.

In Fig. 4 I have illustrated a modified form of oscillatory unit 46 designated generally by the reference character 46'. This unit is adapted to be substituted for the unit 46 shown in Figs. 1, 2 and 3. In fact, in Fig. 4 I have illustrated it as being applied to the shaft section 37 of the brush 10.

The unit 46' comprising an annular member 47' is provided with an opening 48' thru which the squared portion 38 of the shaft section extends. The member 47' is provided with an annular recess 45' which forms a shoulder 44'. Disposed about the member 47' and abutting the annular shoulder 44' is a tube or hose 43' of rubber or fabric or both which is held against the shoulder by means of an annular plate 42' secured to the member 47' by screws 41'. Obviously, by removing the nut 41 from the shaft section 37 the unit 46' can be removed with facility from the section. Furthermore, the hose 43' may be removed from the member 47' by removing the plate 42'. The oscillatory unit 46' may be used as a polishing member in connection with the coating of the inner surface of a tube.

Figure 2:
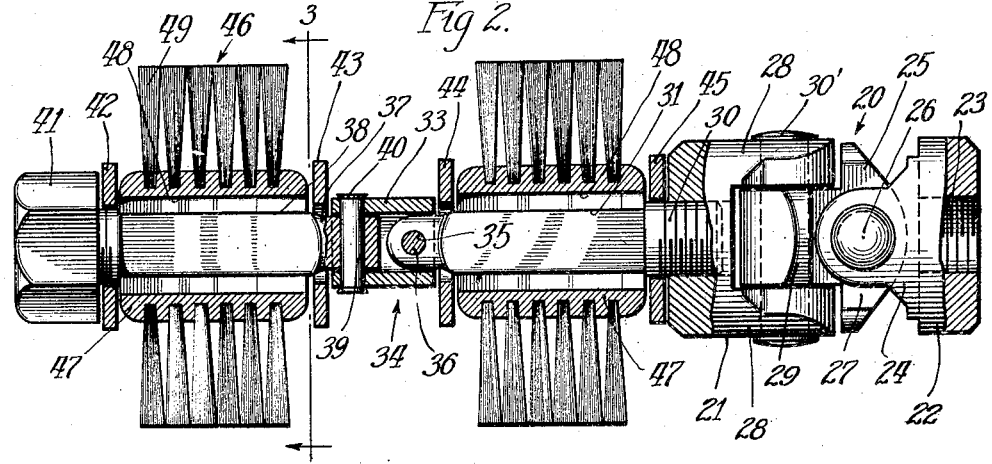
Fig. 2 is a sectional view taken on the line 2—2 of Fig. 1 looking in the direction indicated by the arrow.

Referring to the form of the brush shown in Figs. 1 to 3, it will be observed that the brush units 46 are readily removable from their associated shaft sections. By disengaging the shaft section 30 from the coupling member 21 it is possible to remove the brush unit 46 from this shaft section. By removing the nut 41 from the end of the shaft 37 the unit 46 may be slid endwise from the section 37. Thus it will be evident that I have provided a brush construction which may be readily disassembled for purposes of repair and replacement of parts.

I claim:—

In combination, a rotating shaft of rectangular cross section, a hub member having an opening therethrough through which said shaft extends, said opening being oblong in cross-section, one dimension of said oblong opening being substantially the same as one dimension of the rectangular rotating shaft and the other dimension of the opening being greater than the other dimension of the rotating shaft, whereby angular movement of said shaft is imparted to said hub and said hub is permitted to move outwardly from the axis of rotation under centrifugal force, and brush elements on said hub.

In witness whereof, I hereunto subscribe my name this 24th day of February, 1927.

CHARLES F. MOORE.